United States Patent
Li et al.

(10) Patent No.: US 9,716,616 B2
(45) Date of Patent: *Jul. 25, 2017

(54) ACTIVE IP FORWARDING IN AN EVENT DRIVEN VIRTUAL LINK AGGREGATION (VLAG) SYSTEM

(71) Applicant: International Business Machines Corporation, Armonk, NY (US)

(72) Inventors: Yuan Wx Li, Changzhou (CN); Tamanna Z. Sait, San Jose, CA (US); Naveen C. Sekhara, Milpitas, CA (US); Venkatesan Selvaraj, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/832,877

(22) Filed: Aug. 21, 2015

(65) Prior Publication Data

US 2015/0365270 A1    Dec. 17, 2015

Related U.S. Application Data

(63) Continuation of application No. 14/064,014, filed on Oct. 25, 2013, now Pat. No. 9,160,618, which is a
(Continued)

(51) Int. Cl.
    *H04L 12/28* (2006.01)
    *H04L 12/24* (2006.01)
    (Continued)

(52) U.S. Cl.
    CPC ...... *H04L 41/0654* (2013.01); *H04L 41/0663* (2013.01); *H04L 41/0668* (2013.01);
    (Continued)

(58) Field of Classification Search
    None
    See application file for complete search history.

(56) References Cited

U.S. PATENT DOCUMENTS

| 8,264,959 | B2 | 9/2012 | Licardie et al. |
| 8,787,149 | B1 | 7/2014 | Ramanathan et al. |
| (Continued) | | | |

OTHER PUBLICATIONS

Notice of Allowance from U.S. Appl. No. 13/754,737, dated Dec. 19, 2014.
(Continued)

*Primary Examiner* — Chirag Shah
*Assistant Examiner* — Amar Persaud
(74) *Attorney, Agent, or Firm* — Zilka-Kotab, P.C.

(57) ABSTRACT

In one embodiment, a networking switch includes an interswitch link (ISL) interface configured to communicate with a second networking switch via an ISL and a networking port configured to connect to an access switch in Layer-2 (L2) via a virtual link aggregation (vLAG) with the second networking switch. The networking switch includes a virtual router redundancy protocol (VRRP) module configured to perform active interact protocol (IP) forwarding. Moreover, the VRRP module is configured to indicate a status of the networking switch to the second networking switch via the ISL. The status is one of: initialization when the networking switch is not currently active (INIT), back-up status when the networking switch is acting as a back-up switch (BACKUP), or master status when the networking switch is acting as a master switch (MASTER). In addition, the networking switch is positioned at a boundary between L2 and Layer-3 (L3).

20 Claims, 8 Drawing Sheets

Related U.S. Application Data continuation of application No. 13/754,737, filed on Jan. 30, 2013, now Pat. No. 9,019,813.

(51) Int. Cl.
*H04L 12/931* (2013.01)
*H04L 12/939* (2013.01)
*H04L 12/935* (2013.01)

(52) U.S. Cl.
CPC ............ *H04L 49/30* (2013.01); *H04L 49/552* (2013.01); *H04L 49/557* (2013.01); *H04L 49/70* (2013.01)

(56) References Cited

U.S. PATENT DOCUMENTS

| | | | | |
|---|---|---|---|---|
| 8,797,149 B2* | 8/2014 | Harris | .................... | G08C 17/02 340/12.22 |
| 9,019,813 B2 | 4/2015 | Li et al. | | |
| 9,160,618 B2 | 10/2015 | Li et al. | | |
| 2002/0184387 A1* | 12/2002 | Yamaya | .................. | H04L 45/00 709/238 |
| 2007/0121617 A1 | 5/2007 | Kanekar et al. | | |
| 2008/0275975 A1* | 11/2008 | Pandey | .................... | H04L 49/70 709/223 |
| 2012/0033672 A1 | 2/2012 | Page et al. | | |
| 2013/0051229 A1* | 2/2013 | Rabie | .................. | H04L 12/5695 370/230 |
| 2013/0258839 A1* | 10/2013 | Wang | .................. | H04L 41/0668 370/221 |
| 2014/0050225 A1* | 2/2014 | Kuo | ........................ | H04L 45/00 370/401 |
| 2014/0198793 A1* | 7/2014 | Allu | ...................... | H04L 45/245 370/392 |
| 2014/0204761 A1* | 7/2014 | Durrani | .................. | H04L 47/41 370/236 |
| 2014/0211607 A1 | 7/2014 | Li et al. | | |
| 2014/0211792 A1 | 7/2014 | Li et al. | | |
| 2014/0241147 A1* | 8/2014 | Rajagopalan | ......... | H04L 45/245 370/221 |

OTHER PUBLICATIONS

Li et al., U.S. Appl. No. 13/754,737, filed Jan. 30, 2013.
Li et al., U.S. Appl. No. 14/064,014, filed Oct. 25, 2013.
Notice of Allowance from U.S. Appl. No. 14/064,014, dated Jun. 1, 2015.

* cited by examiner

ACTIVE IP FORWARDING IN AN EVENT DRIVEN VIRTUAL LINK AGGREGATION (VLAG) SYSTEM

BACKGROUND

The present invention relates to data center infrastructure and operation, and more particularly, this invention relates to active IP forwarding in an event driven virtual Link Aggregation (vLAG) system.

Generally, link aggregation allows a networking system backbone speed to grow incrementally as demand on the network increases by aggregating multiple physical networking ports or links within a single switch into a single logical link. Any traffic which is bound for this single logical link may be distributed across the multiple physical ports. Many standards exist to dictate how these aggregated ports are treated, set up, etc. Some examples of existing standards are 802.3ad port aggregation with link aggregation control protocol (LACP), 802.1AX, etc. All physical ports in the link aggregation group must reside on the same physical switch, which in most scenarios will result in a single point of failure when he physical switch to which the physical links are connected goes offline. Link aggregation operates transparently to end-devices while providing redundancy and link resiliency for various networking protocols and speeds, e.g., Ethernet (10 Mbit/s, 100 Mbit/s, 1,000 Mbit/s, and/or 10 Gbit/s).

Therefore, there is a need for the ability to provide a quick and reliable method and system to prevent networking loops for the aggregation of multiple physical links spanning across at least two physical networking systems.

SUMMARY

In one embodiment, a networking switch includes an interswitch link (ISL) interface configured to communicate with a second networking switch via an ISL and at least one networking port configured to connect to an access switch in Layer-2 (L2) via a virtual link aggregation (vLAG) with the second networking switch. The networking switch also includes a virtual router redundancy protocol (VRRP) module configured to perform active internet protocol (IP) forwarding when the second networking switch connected via the ISL is not performing active IP forwarding. Moreover, the VRRP module is configured to indicate a status of the networking switch to the second networking switch via the ISL. The status is one of initialization when the networking switch is not currently active (INIT), back-up status when the networking switch is acting as a back-up switch (BACK-UP), or master status when the networking switch is acting as a master switch (MASTER). In addition, the networking switch is positioned at a boundary between L2 and Layer-3 (L3).

In another embodiment, a method includes coupling a first networking switch with a second networking switch using an ISL. The first networking switch is positioned at a boundary between L2 and L3 and the second networking switch is positioned at the boundary between L2 and L3. The method also includes creating a vLAG having connections between the first and second networking switches and an access switch in L2, with each networking switch including a VRRP module. Also, the method includes interacting and modifying a VRRP state machine to perform active IP forwarding when a connection between one of the networking switches and the access switch fails or one of the networking switches does not function properly, and indicating state events using each of the first and second networking switches associated with the vLAG via the ISL. Moreover, the state events are selected from the group including: INIT, LOCAL-UP, REMOTE-UP, and FORMED.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a networking system includes a first networking switch positioned at a boundary between Layer-2 (L2) and Layer-3 (L3), the first networking switch including a first virtual router redundancy protocol (VRRP) module, a second networking switch connected to the first networking switch via an interswitch link (ISL), the second networking switch being positioned at the boundary between L2 and L3 and including a second VRRP module, and an access switch positioned in L2, the access switch being capable of being connected to the first and second networking switches in a virtual link aggregation (vLAG), the first VRRP module being adapted for performing active internet protocol (IP) forwarding when the second networking switch is not performing active IP forwarding, and the second VRRP module being adapted for performing active IP forwarding when the second networking switch is not performing active IP forwarding.

In another general embodiment, a method for managing vLAG includes coupling a first networking switch with a second networking switch using an ISL, wherein the first networking switch is positioned at a boundary between L2 and L3, and wherein the second networking switch is positioned at the boundary between L2 and L3, creating a vLAG comprising connections between the first and second networking switches and an access switch in L2, wherein each networking switch comprises a VRRP module, and interacting and modifying a VRRP state machine to perform active IP forwarding when a connection between one of the networking switches and the access switch fails or one of the networking switches does not function properly.

In yet another general embodiment, a networking system includes a first networking switch positioned at a boundary between L2 and L3, the first networking switch including a first VRRP module, a second networking switch connected to the first networking switch via an ISL, the second networking switch being positioned at the boundary between L2 and L3 and including a second VRRP module, and an access switch positioned in L2, the access switch being capable of being connected to the first and second networking switches in a vLAG, the first VRRP module being adapted for performing active IP forwarding when the second networking switch is not performing active IP forwarding, the second VRRP module being adapted for performing active IP forwarding when the second networking switch is not performing active IP forwarding, wherein each of the first and second networking switches are adapted for indicating state events associated with the vLAG to each other via the ISL, the state events including: initialization (INIT), local switch active (LOCAL-UP), remote switch active (REMOTE-UP), and both switches active (FORMED), and wherein each of the first and second VRRP modules are adapted for indicating status of their respective switch associated with VRRP to each other via the ISL, the statuses including: initialization when a switch is not currently active (INIT), back-up status (BACK-UP), and master status (MASTER).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of a non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
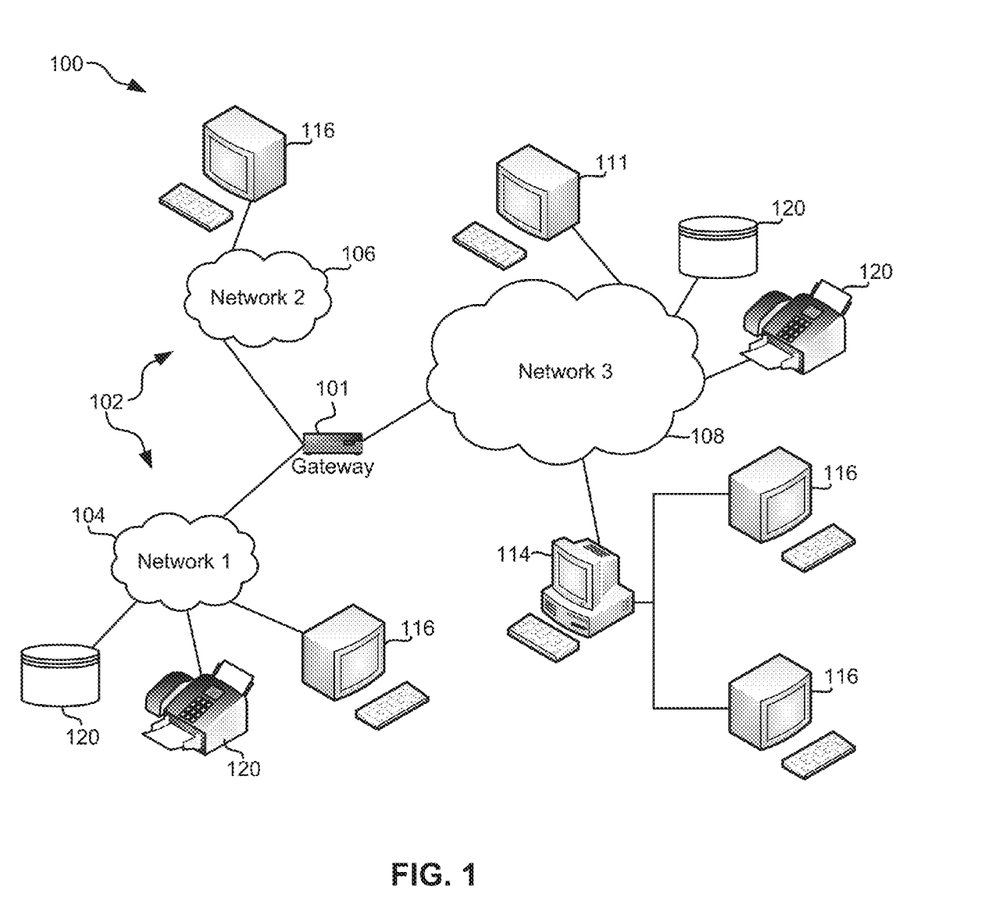
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
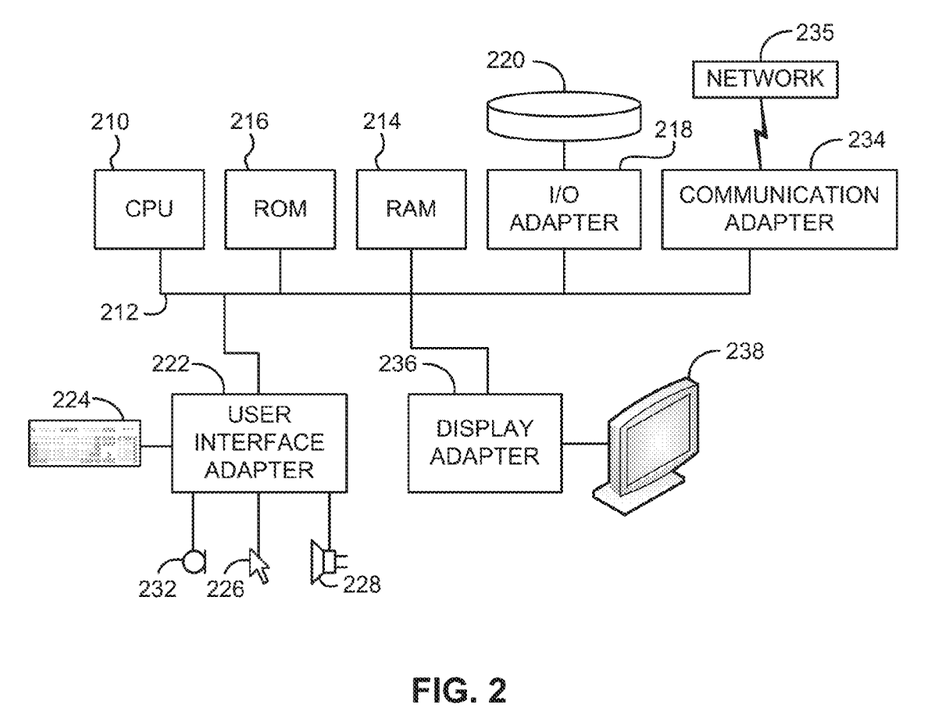
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3A:
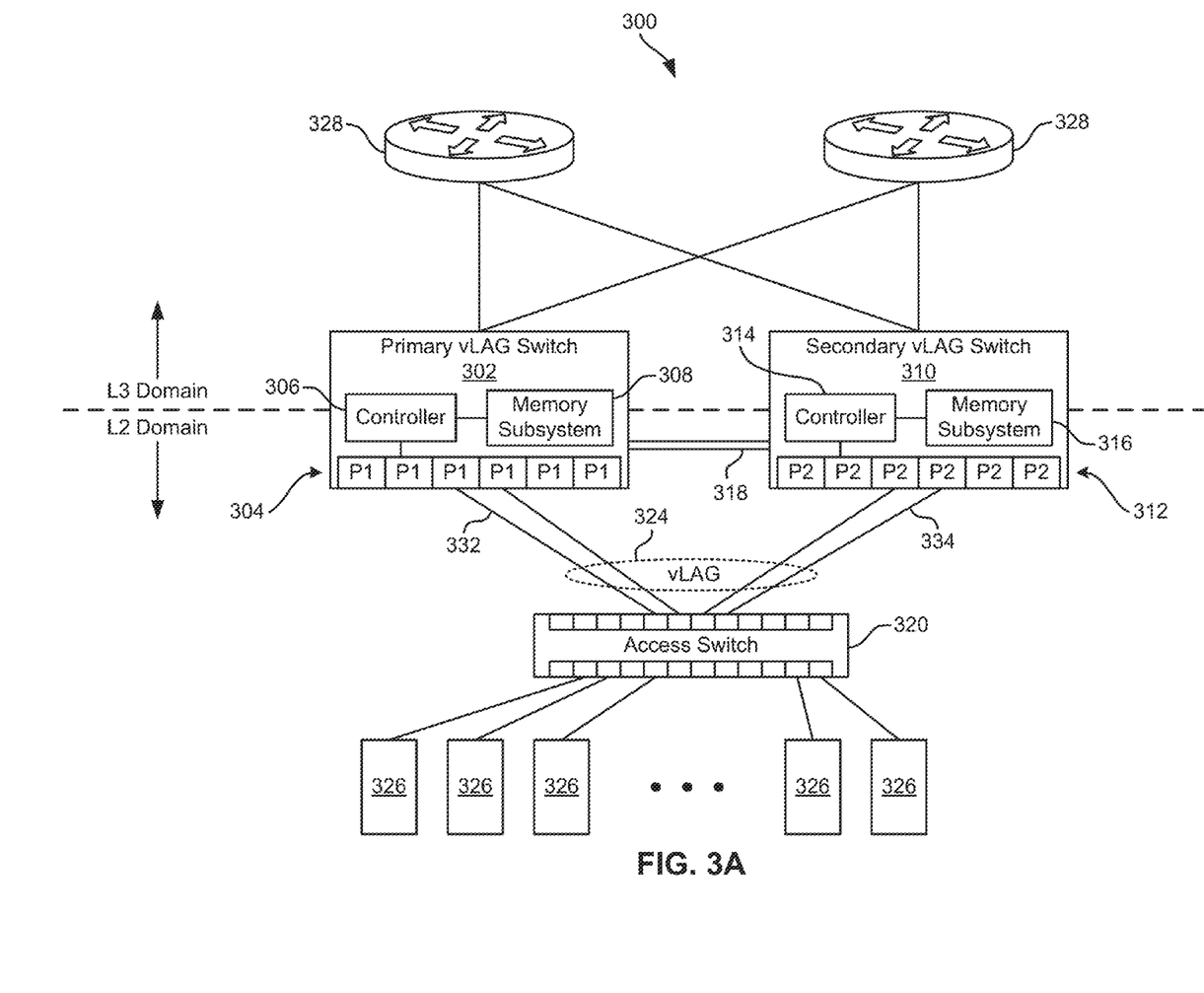
FIG. 3A is a simplified diagram of a networking system, according to one embodiment.

Referring now to FIG. 3A, a simplified diagram of a networking system 300 is shown according to one embodiment. The networking system 300 comprises a primary vLAG switch 302, which includes a plurality of first physical networking ports 304 (P1), a first controller 306, and a first memory subsystem 308. The first physical networking ports 304 are capable of sending and receiving traffic across network connections from any other network device.

The networking system 300 also comprises a secondary vLAG switch 310, such as another switch, router, Ethernet network, etc., which includes a plurality of second physical networking ports 312 (P2), a second controller 314, and a second memory subsystem 316. The second physical networking ports 312 are capable of sending and receiving traffic across network connections from any other network device.

The first controller 306 and the second controller 314 are configured for managing and controlling functions and operations of their respective vLAG switch. Each controller may include a processor of a type suitable for operating a switch, such as a central processing unit (CPU), microcircuit or microchip, field programmable gate array (FPGA), integrated circuit (IC), application specific integrated circuit (ASIC), etc.

In addition, the first memory subsystem 308 and the second memory subsystem 316 are adapted to store information for use by any system, processor, and/or logic of their respective switch, such as their respective controller 306, 314, as would be understood by one of skill in the art. Each memory subsystem 308, 316 may include non-transitory computer readable storage media, such as RAM, ROM, Flash memory, EPROM, etc. Furthermore, each memory subsystem 308, 316 may include any additional components and/or modules as would be useful in storing and retrieving data from the memory subsystem 308, 316, such as a memory controller, connections, I/O interfaces, etc.

In their simplest forms, the memory subsystems 308, 316 may be computer readable storage media capable of storing data for use by their respective controller.

An interswitch link (ISL) 318 may be provided between the primary vLAG switch 302 and the secondary vLAG switch 310. The ISL 318 may be used for communication between the two switches, as would be understood by one of skill in the art.

In a typical data center, each access switch 320 is connected to two aggregation switches 302, 310 for redundancy. The aggregation switches 302, 310 are then connected to various other network devices 328, such as routers, other switches, etc. Duplicate networking traffic may be received by the access switch 320 when one or more of the aggregation switches (primary vLAG switch 302 and secondary vLAG switch 310) are not functioning and/or cooperating properly to establish a vLAG 324 therebetween.

The access switch 320 may be in communication with one or more network devices 326, such as workstations, servers, end hosts, etc., as would be understood by one of skill in the art, in which access to the networking system 300 is to be provided.

Figure 3B:
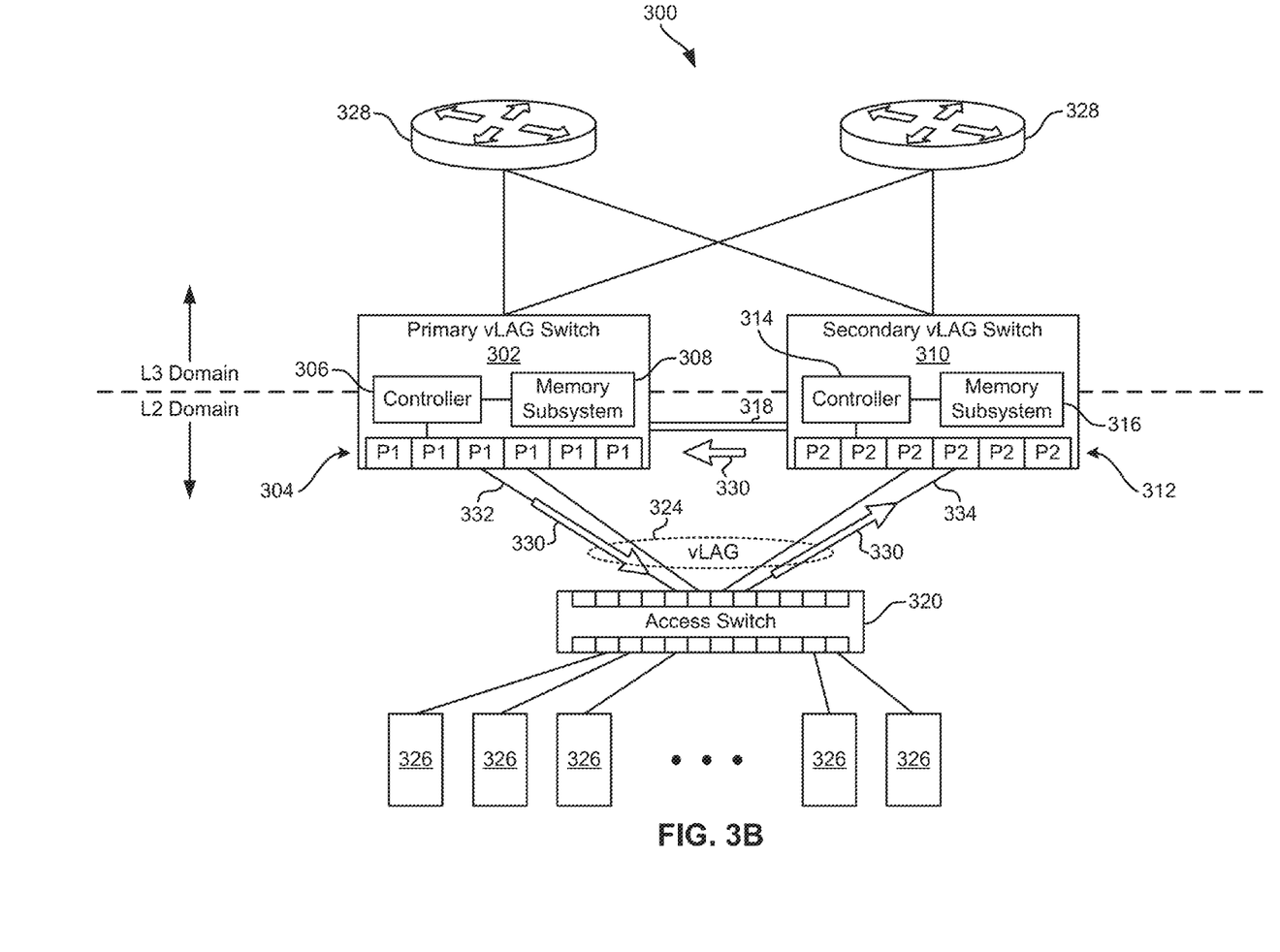
FIG. 3B is a simplified diagram of the networking system, according to one embodiment.

One issue with using vLAG 324 in a networking system 300 which utilizes a primary access switch 302 and a secondary (or backup) access switch 320 is that, as shown in FIG. 3B, networking traffic loops may exist when a vLAG 324 is not properly established therebetween. For example, a networking packet may be sent by the access switch 320 and then forwarded back to the access switch 320 along a path from the primary vLAG switch 302 to the secondary vLAG switch 310 and back to the access switch 320, or via a path from the secondary vLAG switch 310 to the primary vLAG switch 302 and back to the access switch 320, as shown in FIG. 3B and represented by the block arrows 330.

Normally, Spanning Tree Protocol (STP) is used to break the loop created by the two aggregation switches 302, 310 by blocking one side of the connection, hence a 50% reduction of the available bandwidth is provided between the rack layer and the aggregation layer, as would be understood by one of skill in the art. The proposed virtual link aggregation (vLAG) 324 provides the ability to utilize the full bandwidth of both aggregation switches 302, 310: (i) without sacrificing the desired redundancy or resiliency of using the at least two aggregation switches 302, 310; and (ii) without breaking off the connectivity between the access switch 320 and the aggregation switches 302, 310. Thus, an access switch 320 has all its uplinks in a LAG while the aggregation switches 302, 310 cooperate with each other to maintain this vLAG 324. Existing standard LAG methods known in the art are generally limited to only being operable within a single physical networking system or a switch, and therefore are not capable of being used in the networking system 300 shown in FIGS. 3A and 3B.

The system 300 shown in FIGS. 3A and 3B that comprises the vLAG 324 provides the ability to aggregate, at the aggregation layer, multiple physical links spanning at least two physically separate networking systems or switches. In order to achieve active-active forwarding and smooth failover/failback in an event driven vLAG system, some modifications may be made to the Virtual Router Redundancy Protocol (VRRP), as described herein according to various embodiments.

According to yet another embodiment, the possibility of using multiple mechanisms to handle link failures is provided. This provides even greater support for link failures to reduce or eliminate dropped packets and/or misrouted data due to failed links.

In typical network deployments, at a Layer2/Layer3 boundary (denoted by the L2/L3 Domain arrows), VRRP is used to provide gateway redundancy. In the absence of vLAG in such a Layer2/Layer3 boundary, VRRP runs between the switches 302, 310, selects one of the switches 302 as Master responsible for IP forwarding and the other switch 310 as Backup which takes over the forwarding role when the Master switch (Primary vLAG Switch 302) fails. vLAG switches 302, 310 in a Layer-2/Layer-3 boundary in topologies similar to that shown in FIG. 3A demand active forwarding by both of the vLAG switches 302, 310. The interaction between the event driven vLAG state machine and VRRP to achieve active IP forwarding is described in various scenarios. Also, the synchronization of address resolution protocol (ARP) learnt over vLAG links 324 is described in a way that achieves faster fail-over.

In the network 300, VRRP packets are exchanged over ISL 318 and one of the switches is selected as Master and one as Backup. A VRRP module in each switch 302, 310 receives the described events from the vLAG 324 and acts on them to provide active-active forwarding. In systems involving multiple switches connected via one or more ISLs 318, typically there are four states that the various switches 302, 310 may be in. Both switches 302, 310 up and running ("FORMED"), local switch up and running but not informed of remote switch's status or remote switch's status is not up ("LOCAL-UP"), local switch down but remote switch up ("REMOTE-UP"), and both local and remote switch 302, 310 not up, but possibly initializing ("INIT").

Figure 4:
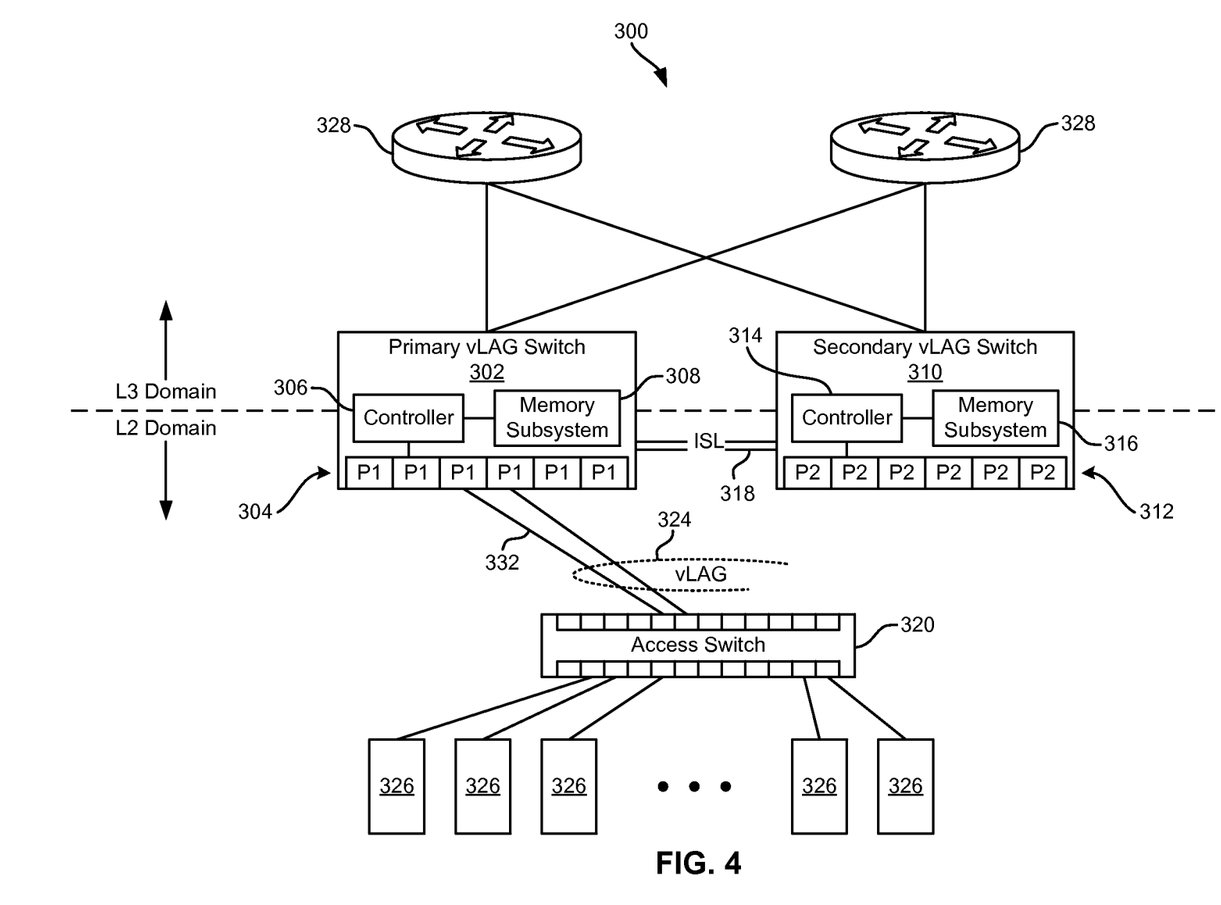
FIG. 4 is a simplified diagram of the networking system with a link down, according to one embodiment.

Now referring to FIG. 4, with continued reference to network 300, relationships between the primary vLAG switch 302 and the secondary vLAG switch 310 are shown when the primary vLAG switch 302 is up and the status is LOCAL-UP (i.e., the secondary vLAG switch 310 is down).

Once a LOCAL-UP event is detected by the primary vLAG switch 302, and when the underlying vLAG trunk (one or more connections 332 between the access switch 320 and the primary vLAG switch 302) is coming up for the first time (INIT→LOCAL-UP) or the remote trunk is down (FORMED→LOCAL-UP), a further determination is made as to a state of a virtual router instance of the vLAG switch over the vLAG 324. If the vLAG state transition is from INIT to LOCAL-UP, one of two operations may be performed: 1) when a virtual router instance of the vLAG switch over the vLAG 324 is in the Master state (such as a VRRP state of the primary vLAG switch 302), no action is taken; 2) when a virtual router instance of the LAG switch over the vLAG 324 is in Backup (such as a VRRP state of the secondary vLAG switch 310), all of the normal switching actions similar to the VRRP Master are performed by the secondary vLAG switch 310, such as responding to any address resolution protocol (ARP) requests for virtual IP addresses, in order to achieve active forwarding.

When the vLAG state transition is from FORMED to LOCAL-UP, no action is taken. When the link between the access switch 320 and the secondary vLAG switch 310 is down (as in FIG. 4) or when the secondary vLAG switch 310 reboots, the primary vLAG switch 302 continues to perform active IP forwarding without any disturbance, because it is the Master to begin with.

Figure 5:
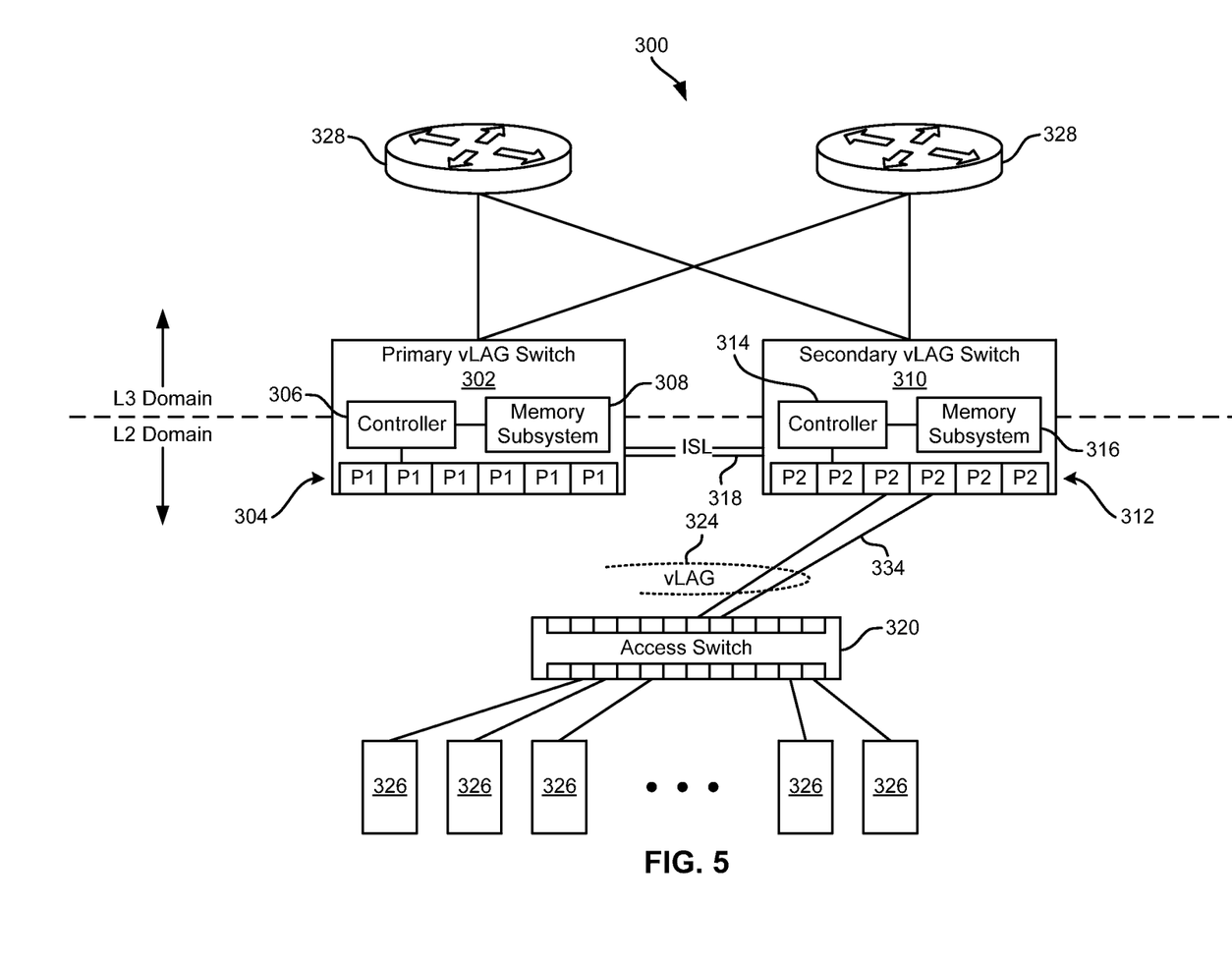
FIG. 5 is a simplified diagram of the networking system with a link down, according to one embodiment.

Now referring to FIG. 5, with continued reference to network 300, another state transition may occur when a vLAG switch detects REMOTE-UP (such as the state which the primary vLAG switch 302 would experience) when the underlying trunk 334 on the peer switch (secondary vLAG switch 310) is coming up when the local trunk is down (INIT→REMOTE-UP), or when the local trunk goes down with the remote peer link 334 up (FORMED→REMOTE_UP). When the vLAG state transition is from FORMED to REMOTE-UP or INIT to REMOTE_UP, no action is taken, because the switch on which these transitions occur does not have access to the vLAG 324.

Instead, when the local trunk is down on the primary vLAG switch 302, the secondary vLAG switch 310 will transition to LOCAL_UP and perform the active IP forwarding, just like it is the Master.

Referring again to FIG. 3A, the primary vLAG switch 302 may detect the FORMED state upon detecting that the local underlying trunk 332 has come up when the remote peer trunk 334 is up (REMOTE_UP→FORMED) or when the remote peer trunk 334 comes up with the local trunk 332 being already up (LOCAL_UP→FORMED). When the vLAG state transition is from LOCAL_UP to FORMED and the virtual router instance is in Backup or Master state, the ARP entries learnt over the underlying local vLAG trunk 332 are synchronized to the corresponding vLAG trunk 334 on the peer switch (the secondary vLAG switch 310).

When the vLAG state transition is from REMOTE_UP to FORMED: a) when the virtual router instance over the vLAG 324 is in the Master state, the peer switch (the secondary vLAG switch 310) will transition from LOCAL_UP to FORMED and initiate ARP synchronization for all the ARP entries learnt on the vLAG trunk 332 local to the primary vLAG switch 302; b) when the virtual router instance over the vLAG 324 is in Backup (such as the secondary vLAG switch 310), all of the actions to perform active IP forwarding (such as responding to ARP requests for virtual IP addresses similar to the VRRP Master) are performed by the secondary vLAG switch 310. The peer switch (the secondary vLAG switch 310) moves from LOCAL_UP to FORMED and initiates ARP synchronization for all the ARP entries learnt on the local vLAG trunk 332 for the primary vLAG switch 302 over the ISL 318. This transition may occur when the vLAG switch goes down and comes up, where the active IP forwarding is setup right away when the local-trunk 334 comes up.

When the vLAG state transitions from LOCAL_UP or FORMED to INIT: when the virtual router instance over the vLAG 324 is in the Master state, no action is taken, because the Master switch is not currently capable of active operations in the vLAG 324; when the virtual router instance over the vLAG 324 is in the Backup state, all the settings made to perform active IP forwarding are reset. When the state transitions from REMOTE_UP to INIT, no action is taken.

Figure 6:
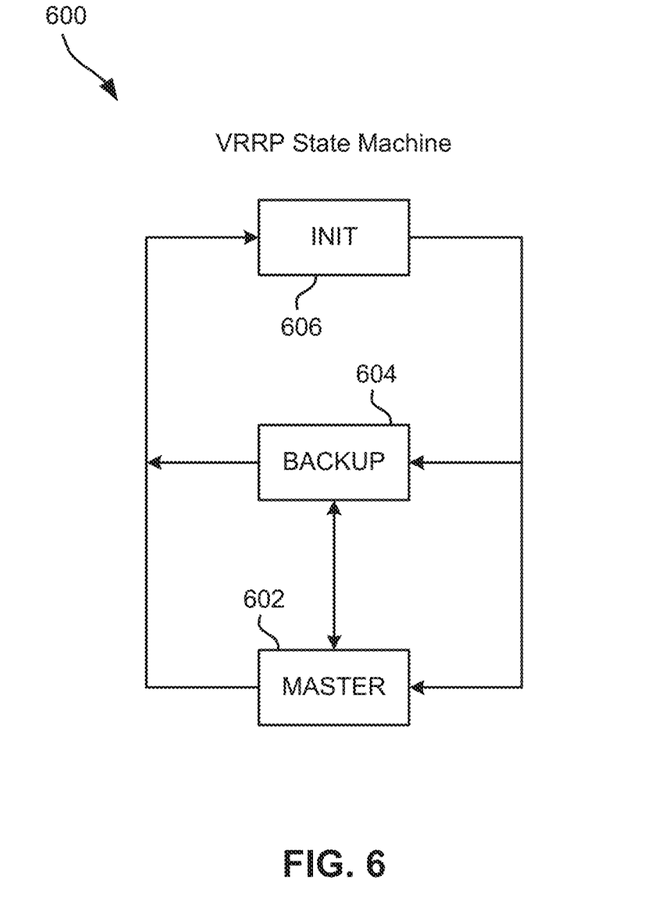
FIG. 6 shows statuses of a virtual router redundancy protocol (VRRP) state machine, according to one embodiment.

Now referring to FIG. 6, statuses of the VRRP state machine 600 are shown according to one embodiment. As shown, state INIT 606 may transition to BACKUP 604 (the state which the secondary vLAG switch 310 is in as the Back-up) or to MASTER 602 (the state that the primary vLAG switch 302 is in as the Master). The BACKUP 604 may transition to INIT 606 to reset or MASTER 602 when the previous Master fails, and MASTER 602 may transition to BACKUP 604 or to INIT 606.

In a transition to the INIT state 606, when a previous state is MASTER 602, no action is required from the perspective of vLAG operations. However, when the previous state is BACKUP 604, and when any of the underlying vLAG states are LOCAL-UP or FORMED, all the settings made to perform active IP forwarding are reset; otherwise, no action is taken.

In a transition to the BACKUP state 604, when the previous state is INIT 606, and when any of the underlying vLAG states are LOCAL-UP or FORMED, all the actions to perform active IP forwarding are taken (such as responding to ARP requests for virtual IP addresses similar to the VRRP Master). In addition, the complete sync of ARP entries for the underlying vLAG trunks is requested. However, when the previous state is MASTER 602, and when any of the underlying vLAG states are LOCAL_UP or FORMED, the states programmed to perform active IP forwarding are preserved in the VRRP Master state and the complete synchronization of ARP entries for the underlying vLAG trunks is requested. No action is taken in all other scenarios.

In a transition to the MASTER state 602, when the previous state is BACKUP 604, and when any of the underlying vLAG states are LOCAL-UP or FORMED, the states programmed to perform active IP forwarding based on the underlying vLAGs in the Back-up state are preserved; otherwise, the processing of a VRRP master is performed as per VRRP protocol. When the previous VRRP state is INIT 606, the processing of a VRRP master is performed as per VRRP protocol, and no specific action is taken for vLAG.

The handling of ARP requests for virtual IP addresses may be resolved in a number of ways depending on the various states of the local switch. Whenever the ARP request is resolved for the hosts using the virtual IP address as gateway over a vLAG trunk in the FORMED state, the corresponding vLAG trunk is synchronized on the peer switch. This synchronization works over the ISL. This helps to keep the peer switch with all the details required to do the smooth forwarding when one of the switches fails.

Moreover, this synchronization may occur after the synchronization of learnt MAC addresses.

In one embodiment, referring again to FIGS. 3A-6, a networking system 300 may comprise a first networking switch 302 positioned at a boundary between L2 and L3, the first networking switch comprising a first VRRP module; a second networking switch 310 connected to the first networking switch via an interswitch link (ISL), the second networking switch being positioned at the boundary between L2 and L3 and comprising a second VRRP module; and an access switch 320 positioned in L2, the access switch being capable of being connected to the first and second networking switches in a vLAG. The first VRRP module may be adapted for performing active IP forwarding when the second networking switch is not performing active IP forwarding, the second VRRP module may be adapted for performing active IP forwarding when the second networking switch is not performing active IP forwarding, and each of the first and second networking switches may be adapted for indicating state events associated with the vLAG to each other via the ISL. The state events may comprise: initialization (INIT), local switch active (LOCAL-UP), remote switch active (REMOTE-UP), and both switches active (FORMED), and each of the first and second VRRP modules may be adapted for indicating status of their respective switch associated with VRRP to each other via the ISL, with the statuses comprising: initialization when a switch is not currently active (INIT), back-up status (BACK-UP), and master status (MASTER).

In a further embodiment, in dealing with vLAG state changes, each of the first and second networking switches may be adapted for any of the following: when a transition from the INIT state to the LOCAL-UP state is detected and when a virtual router instance over the vLAG has the BACK-UP status, active IP forwarding may be set up such that any ARP requests are responded to; when a transition from the LOCAL-UP state to the FORMED state is detected, ARP entries learnt over the vLAG may be synchronized with a vLAG peer switch; when a transition from the REMOTE-UP state to the FORMED state is detected, and when a virtual router instance over the vLAG has the BACK-UP status, active IP forwarding may be set up such that any ARP requests are responded to; and/or when a transition from the LOCAL-UP state or the FORMED state to the INIT state is detected, and when a virtual router instance over the vLAG has the BACK-UP status, all settings made for performing active IP forwarding may be reset.

In another further embodiment, in dealing with VRRP status changes, each of the first and second networking switches may be adapted for any of the following: when a transition from the BACK-UP status to the INIT status is detected, and when a networking switch in the vLAG indicates the LOCAL-UP state or the FORMED state, all settings made for performing active IP forwarding may be reset; when a transition from the INIT status to the BACK-UP status is detected, and when a networking switch in the vLAG indicates the LOCAL-UP state or the FORMED state, active IP forwarding may be set up such that any ARP requests are responded to; when a transition from the INIT status to the BACK-UP status is detected, and when a networking switch in the vLAG indicates the LOCAL-UP state or the FORMED state, setting up active IP forwarding such that any ARP requests may be responded to and a request may be sent to synchronize all ARP entries learnt over the vLAG with a vLAG peer switch; when a transition from the MASTER status to the BACK-UP status is detected, and when a networking switch in the vLAG indicates the LOCAL-UP state or the FORMED state, preserving any programmed active IP forwarding logic; and/or when a transition from the BACK-UP status to the MASTER status is detected, and when a networking switch in the vLAG indicates the LOCAL-UP state or the FORMED state, any programmed active IP forwarding logic may be preserved.

Figure 7:
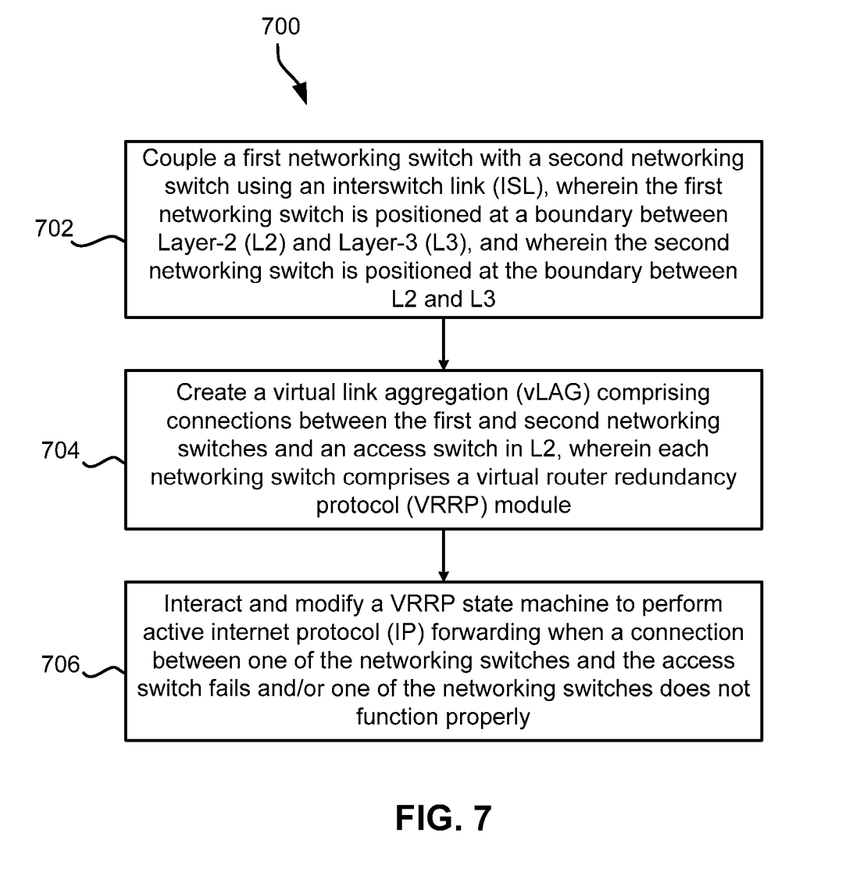
FIG. 7 shows a flowchart of a method, according to one embodiment.

Now referring to FIG. 7, a flowchart of a method 700 for managing vLAG is shown, according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a networking system, a switch, a router, a processor (such as a CPU, an ASIC, an FPGA, etc.), a server, etc., or any other suitable device or component of a networking system.

As shown in FIG. 7, method 700 may initiate with operation 702, where a first networking switch is coupled with a second networking switch using an interswitch (ISL), wherein the first networking switch is positioned at a boundary between Layer-2 (L2) and Layer-3 (L3), and wherein the second networking switch is positioned at the boundary between L2 and L3.

In operation 704, a vLAG is created comprising connections between the first and second networking switches and an access switch in L2. Each networking switch may comprise a VRRP module, in one approach.

In operation 706, a VRRP state machine may be interacted with and modified to perform active IP forwarding when a connection between one of the networking switches and the access switch fails and/or one of the networking switches does not function properly.

In one embodiment, the method 700 may further comprise indicating state events using each of the first and second networking switches associated with the vLAG via the ISL, wherein the state events comprise: INIT, LOCAL-UP, REMOTE-UP, and FORMED.

In another embodiment, the method 700 may further comprise indicating status using each of the first and second VRRP modules of their respective switch associated with VRRP via the ISL. The statuses comprise: INIT, BACK-UP, and MASTER.

In yet another embodiment, the method 700 may further comprise any and/or all of the following, using each of the first and second networking switches: when a transition from the INIT state to the LOCAL-UP state is detected and when a virtual router instance over the vLAG has the BACK-UP status, active IP forwarding may be set up such that any ARP requests are responded to; when a transition from the LOCAL-UP state to the FORMED state is detected, ARP entries learnt over the vLAG may be synchronized with a vLAG peer switch; when a transition from the REMOTE-UP state to the FORMED state is detected, and when a virtual router instance over the vLAG has the BACK-UP status, active IP forwarding may be set up such that any ARP requests are responded to; and/or when a transition from the LOCAL-UP state or the FORMED state to the INIT state is detected, and when a virtual router instance over the vLAG has the BACK-UP status, all settings made for performing active IP forwarding may be reset.

In yet another embodiment, the method 700 may further comprise any and/or all of the following, using each of the first and second networking switches: when a transition from the BACK-UP status to the INIT status is detected, and when a networking switch in the vLAG indicates the LOCAL-UP state or the FORMED state, all settings made for performing active IP forwarding may be reset; when a transition from the INIT status to the BACK-UP status is detected, and when a networking switch in the vLAG indicates the LOCAL-UP state or the FORMED state, active IP forwarding may be set up such that any ARP requests are responded to; when a transition from the INIT status to the BACK-UP status is detected, and when a networking switch vLAG indicates the LOCAL-UP state or the FORMED state, active IP forwarding may be set up such that any ARP requests are responded to and sending a request to synchronize all ARP entries learnt over the vLAG with a vLAG peer switch; when a transition from the MASTER status to the BACK-UP status is detected, and when a networking switch in the vLAG indicates the LOCAL-UP state or the FORMED state, any programmed active IP forwarding logic may be preserved; and/or when a transition from the BACK-UP status to the MASTER status is detected, and when a networking switch in the vLAG indicates the LOCAL-UP state or the FORMED state, any programmed active IP forwarding logic may be preserved.

The method 700 may be performed, in various embodiments comprising all or some of the operations described in FIG. 7, in computer program products, other methods, logic, and/or systems, such as the networking system 300 described in relation to FIGS. 3A-5, among others.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A networking switch, comprising:
an interswitch link (ISL) interface configured to couple the networking switch with a second networking switch via an ISL;

at least one networking port configured to connect to an access switch in Layer-2 (L2) via a virtual link aggregation (vLAG) comprising connections with the second networking switch; and a virtual router redundancy protocol (VRRP) module configured to:
  interact and modify a VRRP state machine to perform active internet protocol (IP) forwarding when a connection fails between the second networking switch and the access switch or the second networking switch does not function properly; and
  indicate state events associated with the vLAG to the second networking switch via the ISL, wherein the state events comprise: a state indicating initialization when neither networking switch connected via the ISL is currently active (INITIAL), a state indicating that the vLAG is active on the networking switch only (LOCAL-UP), a state indicating that the vLAG is active on the second networking switch only (REMOTE-UP), and a state indicating that the vLAG is active on both networking switches (FORMED), wherein the networking switch is positioned at a boundary between L2 and Layer-3 (L3), and wherein the second networking switch is positioned at the boundary between L2 and L3.

2. The networking switch as recited in claim 1, wherein the VRRP module is configured to indicate a status of the networking switch to the second networking switch via the ISL, wherein the status comprises: an initialization status when the networking switch is not currently active (INIT), a back-up status when the networking switch is acting as a back-up switch (BACK-UP), and a master status when the networking switch is acting as a master switch (MASTER).

3. The networking switch as recited in claim 2, wherein the VRRP module is configured to, in response to detection of a transition from the INITIAL state to the LOCAL-UP state and detection of a virtual router instance over the vLAG having the BACK-UP status, set up active IP forwarding on the networking switch such that address resolution protocol (ARP) requests are responded to by the networking switch.

4. The networking switch as recited in claim 2, wherein the VRRP module is configured to, in response to detection of a transition from the LOCAL-UP state to the FORMED state, synchronize address resolution protocol (ARP) entries with a vLAG peer switch that have been learnt over the vLAG.

5. The networking switch as recited in claim 2, wherein the VRRP module is configured to, in response to detection of a transition from the REMOTE-UP state to the FORMED state and detection of a virtual router instance over the vLAG having the BACK-UP status, set up active IP forwarding on the networking switch such that address resolution protocol (ARP) requests are responded to by the networking switch.

6. The networking switch as recited in claim 2, wherein the VRRP module is configured to, in response to detection of a transition from the LOCAL-UP state or the FORMED state to the INITIAL state and detection of a virtual router instance over the vLAG having the BACK-UP status, reset settings for performing active IP forwarding.

7. The networking switch as recited in claim 2, wherein the VRRP module is configured to, in response to detection of a transition from the BACK-UP status to the INIT status and detection of the second networking switch indicating the LOCAL-UP state or the FORMED state, reset settings for performing active IP forwarding.

8. The networking switch as recited in claim 2, wherein the VRRP module is configured to, in response to detection of a transition from the INIT status to the BACK-UP status and detection of the second networking switch indicating the LOCAL-UP state or the FORMED state, set up active IP forwarding on the networking switch such that address resolution protocol (ARP) requests are responded to by the networking switch.

9. The networking switch as recited in claim 2, wherein the VRRP module is configured to, in response to detection of a transition from the INIT status to the BACK-UP status and detection of the second networking switch indicating the LOCAL-UP state or the FORMED state, set up active IP forwarding on the networking switch such that address resolution protocol (ARP) requests are responded to by the networking switch and send a request to synchronize all ARP entries learnt over the vLAG with a vLAG peer switch.

10. The networking switch as recited in claim 2, wherein the VRRP module is configured to, in response to detection of a transition from the MASTER status to the BACK-UP status and detection of the second networking switch indicating the LOCAL-UP state or the FORMED state, preserve programmed active IP forwarding settings.

11. The networking switch as recited in claim 2, wherein the VRRP module is configured to, in response to detection of a transition from the BACK-UP status to the MASTER status and detection of the second networking switch indicating the LOCAL-UP state or the FORMED state, preserve programmed active IP forwarding settings.

12. A method comprising:
  coupling a first networking switch with a second networking switch using an interswitch link (ISL), wherein the first networking switch is positioned at a boundary between Layer-2 (L2) and Layer-3 (L3), and wherein the second networking switch is positioned at the boundary between L2 and L3;
  creating a virtual link aggregation (vLAG) comprising connections between the first and second networking switches and an access switch in L2, wherein each networking switch comprises a virtual router redundancy protocol (VRRP) module;
  interacting and modifying a VRRP state machine to perform active internet protocol (IP) forwarding when a connection between one of the networking switches and the access switch fails or one of the networking switches does not function properly; and
  indicating state events using each of the first and second networking switches associated with the vLAG via the ISL,
  wherein the state events comprise: a state indicating initialization when neither switch connected via the ISL is currently active (INITIAL), a state indicating that the vLAG is active only on a local networking switch (LOCAL-UP), a state indicating that the vLAG is active only on a remote networking switch (REMOTE-UP), and a state indicating that the vLAG is active on both networking switches connected via the ISL (FORMED).

13. The method as recited in claim 12, further comprising indicating status using each of the first and second VRRP modules of their respective switch associated with VRRP via the ISL, wherein the status comprises: an initialization status when a networking switch is not currently active (INIT), a back-up status when a networking switch is acting as a back-up switch (BACK-UP), and a master status when a networking switch is acting as a master switch (MASTER).

14. The method as recited in claim 13, further comprising, using each of the first and second networking switches, setting up active IP forwarding such that address resolution protocol (ARP) requests are responded to in response to detection of a transition from the INITIAL state to the LOCAL-UP state and detection of a virtual router instance over the vLAG having the BACK-UP status.

15. The method as recited in claim 13, further comprising, using each of the first and second networking switches, synchronizing address resolution protocol (ARP) entries with a vLAG peer switch that have been learnt over the vLAG in response to detection of:
- a transition from the LOCAL-UP state to the FORMED state; or
- a transition from the INIT status to the BACK-UP status and detection of a networking switch in the vLAG indicating the LOCAL-UP state or the FORMED state.

16. The method as recited in claim 13, further comprising, using each of the first and second networking switches, setting up active IP forwarding such that address resolution protocol (ARP) requests are responded to in response to detection of a transition from the REMOTE-UP state to the FORMED state and detection of a virtual router instance over the vLAG having the BACK-UP status.

17. The method as recited in claim 13, further comprising, using each of the first and second networking switches, resetting settings for performing active IP forwarding in response to detection of:
- a transition from the LOCAL-UP state or the FORMED state to the INITIAL state and detection of a virtual router instance over the vLAG having the BACK-UP status; or
- a transition from the BACK-UP status to the INIT status and detection of virtual router instance over the vLAG having the LOCAL-UP state or the FORMED state.

18. The method as recited in claim 13, further comprising, using each of the first and second networking switches, requesting to synchronize all ARP entries learnt over the vLAG with a vLAG peer switch and setting up active IP forwarding such that address resolution protocol (ARP) requests are responded to in response to detection of a transition from the INIT status to the BACK-UP status and detection of a networking switch in the vLAG indicating the LOCAL-UP state or the FORMED state.

19. The method as recited in claim 13, further comprising, using each of the first and second networking switches, preserving any programmed active IP forwarding settings in response to detection of a transition from the MASTER status to the BACK-UP status and detection of a networking switch in the vLAG indicating the LOCAL-UP state or the FORMED state.

20. The method as recited in claim 13, further comprising, using each of the first and second networking switches, preserving programmed active IP forwarding settings in response to detection of a transition from the BACK-UP status to the MASTER status and detection of a networking switch in the vLAG indicating the LOCAL-UP state or the FORMED state.

* * * * *